United States Patent
Zeng et al.

(12) 
(10) Patent No.: US 10,538,954 B2
(45) Date of Patent: Jan. 21, 2020

(54) EXTERNAL INFLATOR

(71) Applicant: TENON (BEIJING) EQUIPMENT CO., LTD., Beijing (CN)

(72) Inventors: Haodong Zeng, Beijing (CN); Gang Liu, Beijing (CN); Yingjie Li, Beijing (CN)

(73) Assignee: TENON (BEIJING) EQUIPMENT CO., LTD., Beijing (CN)

( * ) Notice: Subject to any disclaimer, the term of this patent is extended or adjusted under 35 U.S.C. 154(b) by 169 days.

(21) Appl. No.: 15/559,060

(22) PCT Filed: Mar. 20, 2015

(86) PCT No.: PCT/CN2015/074664
§ 371 (c)(1),
(2) Date: Sep. 18, 2017

(87) PCT Pub. No.: WO2016/149859
PCT Pub. Date: Sep. 29, 2016

(65) Prior Publication Data
US 2018/0128036 A1 May 10, 2018

(51) Int. Cl.
*E06B 3/677* (2006.01)
*C03B 23/24* (2006.01)
*E06B 3/673* (2006.01)

(52) U.S. Cl.
CPC .............. *E06B 3/677* (2013.01); *C03B 23/24* (2013.01); *E06B 3/673* (2013.01)

(58) Field of Classification Search
CPC ........ E06B 3/677; E06B 3/6775; E06B 3/673; C03B 23/24
See application file for complete search history.

(56) References Cited

U.S. PATENT DOCUMENTS 4,780,164 A * 10/1988 Rueckheim ............. E06B 3/677
156/104
4,909,874 A * 3/1990 Rueckheim ........... E06B 3/6775
156/107

(Continued)

FOREIGN PATENT DOCUMENTS

CN 201040739 A 3/2008
CN 101973695 A 2/2011
(Continued)

*Primary Examiner* — Nicolas A Arnett
(74) *Attorney, Agent, or Firm* — Luoh J. Wu; Continent Patent Office LLP

(57) ABSTRACT

Disclosed is an external inflator, comprising a lifting pillar (1). A wide fixing plate is provided on one side of the lifting pillar (1), and the wide fixing plate is fixedly connected to one end of a cableveyor (2); the lifting pillar (1) is sheathed with an upper inflating platform (3) and a lower inflating platform (5), wherein the upper inflating platform (3) is above the lower inflating platform (5), the upper inflating platform (3) is fixedly connected to the other end of the cableveyor (2); and a pressing and positioning assembly (4) is provided between the upper inflating platform (3) and the lower inflating platform (5); the lifting pillar (1) also fixes a lower supporting beam (6). The device is able to reduce the waste of inert gas, provide a stable gas-filled concentration, and satisfy the production requirements of large-size hollow glass.

7 Claims, 6 Drawing Sheets

(56) References Cited

U.S. PATENT DOCUMENTS

| | | | | |
|---|---|---|---|---|
| 5,626,712 A * | 5/1997 | Lisec | ................... | E06B 3/6775 |
| | | | | 141/165 |
| 5,704,405 A * | 1/1998 | Lisec | ................... | E06B 3/6775 |
| | | | | 141/196 |
| 5,735,318 A * | 4/1998 | Vianello | ................ | E06B 3/667 |
| | | | | 141/129 |
| 6,622,456 B2 * | 9/2003 | Almasy | ................ | E06B 3/6775 |
| | | | | 141/5 |
| 8,627,856 B2 * | 1/2014 | McHugh | ............ | B01F 13/1055 |
| | | | | 141/104 |
| 9,951,553 B2 * | 4/2018 | Donohue | ............ | E06B 3/67326 |
| 10,113,354 B2 * | 10/2018 | Queck | ................ | E06B 3/67326 |
| 10,253,552 B2 * | 4/2019 | Donohue | ........... | E06B 3/67386 |
| 2013/0160892 A1 * | 6/2013 | Kemp | ...................... | F17C 5/00 |
| | | | | 141/197 |

FOREIGN PATENT DOCUMENTS

| | | |
|---|---|---|
| CN | 103755159 A | 4/2014 |
| CN | 203474648 U | 12/2014 |

* cited by examiner

EXTERNAL INFLATOR

TECHNICAL FIELD

The present disclosure relates to inflating process for hollow glass, in particular to an external inflator.

BACKGROUND

Inflating inert gas into a hollow glass does not only contribute to improve the energy saving effect of the hollow glass, but also protect the film layer of off-line low irradiation film-coated glass. The inflating operation can be classified into two types, i.e., the manual and automatic operation in terms of its operating ways. The manual operation means that the inflating operation is performed with inflating device held by hand artificially, while the automatic operation can be further classified into internal inflation and external inflation, the internal inflation referring to an inflating operation in which the hollow glass is taken into an inflator by a transferring device before sheet combining, and the external inflation referring to an inflating operation in which the hollow glass is taken into an inflator by a transferring device after sheet combining. There are problems in the prior art that the internal inflation consumes a large amount of inert gas, and the inflating gas concentration is not stable, and the glass size is limited, and the manual inflation has lower working efficiency and a hollow glass with a large size can not be operated artificially.

At present, there is not yet an effective solution in respect to the problems of the inflating process in the prior art such as large consumption of inert gas, unstable inflating gas concentration as well as limitation of glass size.

SUMMARY

In view of the problems of the inflating process in the prior art such as large consumption of inert gas, unstable inflating gas concentration as well as limitation of glass size, the present disclosure aims to provide an external inflator, which is capable of decreasing the waste of the inert gas, providing stable inflating gas concentration and allowing the glass size to meet the requirement for utmost manufacture.

Base on the object above, the present disclosure provides technical solutions as follows.

An external inflator is provided according to an aspect of the present disclosure. The external inflator according to the present disclosure comprises a lifting pillar, which is a long column with rectangular cross-section and provided vertically on a fixing plane; the lifting pillar has a wide fixing plate on one side, with the wide fixing plate fixedly connecting to an end of a cableveyor; the lifting pillar has power cable inside to which the cableveyor is electrically connected via the wide fixing plate; the lifting pillar has an upper inflating platform and an lower inflating platform sheathed thereon, with the upper inflating platform being above the lower inflating platform; the upper inflating platform is fixedly connecting to the other end of the cableveyor via which the upper inflating platform is electrically connecting to the power cable inside the lifting pillar; a pressing and positioning assembly is provided and electrically connected between the upper inflating platform and the lower inflating platform, which allows the lower inflating platform to electrically connect to the power cable inside the lifting pillar; the pressing and positioning assembly is mechanically connected to the upper inflating platform and the lower inflating platform respectively and being able to alter the friction between the lifting pillar and either of the upper inflating platform and the lower inflating platform under electrical control, which allows the upper inflating platform and the lower inflating platform to move or stop; the lifting pillar also has a lower supporting beam fixed at the bottom end thereof, which provides a lowest height limit for the lower inflating platform.

In an embodiment, the upper inflating platform comprises an upper inflating platform frame, which is a rectangular sheet with its rectangular plane being parallel to the front opposite surface of the lifting pillar; the upper inflating platform frame has an upper inflating platform advancing motor assembly fixed at the end thereof and has an upper inflating platform advancing ball screw assembly on the side facing the lifting pillar, with the upper inflating platform advancing motor assembly mechanically connecting to the upper inflating platform advancing ball screw assembly via a wheel shaft assembly provided on the side of the upper inflating platform frame opposite to the lifting pillar, and allowing the upper inflating platform to move close to or away from the lifting pillar by controlling the upper inflating platform advancing ball screw assembly; the upper inflating platform frame has an extension sheet fixed vertically at the end thereof, the extension sheet having an upper inflating platform lifting motor assembly fixed thereon, with the upper inflating platform lifting motor assembly being parallel to the upper inflating platform frame, the upper inflating platform frame having an upper inflating platform entirely lifting slider on the side facing the lifting pillar, the upper inflating platform lifting motor assembly mechanically connecting to the upper inflating platform entirely lifting slider and allowing the upper inflating platform to move up and down relative to the lifting pillar by controlling the upper inflating platform entire lifting slider; the upper inflating platform frame has an upper inflating platform pressing system fixed at the front end thereof, the upper inflating platform pressing system being for providing low barometric pressure to an gas suctioning needle assembly mentioned below; the upper inflating platform frame also has an gas suctioning needle assembly fixed at the front end thereof, the gas suctioning needle assembly being in communication with the upper inflating platform pressing system and being able to suction gas from a needle eye; the upper inflating platform frame also has a positioning camera assembly fixed at the front end thereof, the positioning camera assembly being able to record and locate position of the needle eye.

In an embodiment, the lower inflating platform comprises an lower inflating platform frame, which is a rectangular sheet with its rectangular plane being parallel to the front opposite surface of the lifting pillar; the lower inflating platform frame has an lower inflating platform advancing motor assembly fixed at the end thereof and has an lower inflating platform advancing ball screw assembly on the side facing the lifting pillar, with the lower inflating platform advancing motor assembly mechanically connecting to the lower inflating platform advancing ball screw assembly via a wheel shaft assembly provided on the side of the lower inflating platform frame opposite to the lifting pillar, and allowing the lower inflating platform to move close to or away from the lifting pillar by controlling the lower inflating platform advancing ball screw assembly; the lower inflating platform frame has an extension sheet fixed vertically at the end thereof, the extension sheet having an lower inflating platform lifting motor assembly fixed thereon, with the lower inflating platform lifting motor assembly being parallel to the lower inflating platform frame, the lower inflating platform frame having an lower inflating platform entirely lifting slider on the side facing the lifting pillar, the lower inflating platform lifting motor assembly mechanically connecting to the lower inflating platform entirely lifting slider and allowing the lower inflating platform to move up and down relative to the lifting pillar by controlling the lower inflating platform entire lifting slider; the lower inflating platform frame has an lower inflating platform pressing system fixed at the front end thereof, the lower inflating platform pressing system (56) being for providing high barometric pressure to an gas injecting needle assembly mentioned below; the lower inflating platform frame also has an gas injecting needle assembly fixed at the front end thereof, the gas injecting needle assembly being in communication with the lower inflating platform pressing system and being able to inject gas via a needle eye.

In an embodiment, the upper inflating platform pressing system has the same configuration as the lower inflating platform pressing system, each of them comprising a pressing cylinder connecting plate, a bracket fixing plate, a pressing bracket and a pressing block, in which, the bracket fixing plate is fixed on the side of the upper inflating platform frame or the lower inflating platform frame opposite to the lifting pillar and mechanically connected to the pressing cylinder connecting plate, with the pressing cylinder connecting plate being provided on the side of the upper inflating platform frame or the lower inflating platform frame opposite to the lifting pillar and being able to provide gas of high pressure; the bracket fixing plate is mechanically connected to the pressing bracket, which is a hard sheet and provided vertical to the pressing cylinder connecting plate and the bracket fixing plate, the pressing bracket having a front end fixed to the bracket fixing plate and fixedly connecting to the pressing block by a bolt; the pressing block, being a bended hard bar, has an end fixed to the pressing bracket by a bolt and has the other end provided with a hole, through which the needle head of the gas suctioning needle assembly or the gas injecting needle assembly passes and directs toward the lifting pillar, the outer diameter of the needle head being slightly smaller than the inner diameter of the hole.

In an embodiment, a hollow glass to be inflated is placed vertically on a transferring roller which is used for transferring the hollow glass to a mechanical limiter, the mechanical limiter moving the hollow glass backward, and the hollow glass having two transverse spacer bars fixed inside and two through-holes provided on the side facing the upper inflating platform and the lower inflating platform, with the two through-holes each located at a position where the two transverse spacer bars of the hollow glass are located; the upper inflating platform is configured to move upward along the lifting pillar, during which the positioning camera assembly is configured to locate the height of the two through-holes on the hollow glass, and the upper inflating platform is configured to stay at the position of the upper hole of the two through-holes and transfers the information about the position of the lower hole of the two through-holes to the lower inflating platform, with the lower inflating platform moving upward to the position of the lower hole of the two through-holes; the pressing cylinder connecting plate of the upper inflating platform pressing system is configured to allow the gas suctioning needle assembly to insert into the upper hole, meanwhile the pressing cylinder connecting plate of the lower inflating platform pressing system is configured to allow the gas injecting needle assembly to insert into the lower hole, the gas suctioning needle assembly starts to suction gas and the gas injecting needle assembly starts to inject inert gas; after the injection of the inert gas, the pressing cylinder connecting plate of the upper inflating platform pressing system pulls out the gas suctioning needle assembly, meanwhile the pressing cylinder connecting plate of the lower inflating platform pressing system pulls out the gas injecting needle assembly, both of the upper inflating platform and the lower inflating platform move downward to an original position.

Specifically, the injected inert gas is Argon; the gas exchanging speed of the gas suctioning needle assembly and the gas injecting needle assembly is 50-90 liters per minute.

As seen from above, the technical solution of the present disclosure achieves an automatic inflation under control by using the positioning camera assembly to locate the position of the gas hole of the hollow glass so as to allow the upper inflating platform and the lower inflating platform move up and down to the position of the gas hole along the lifting pillar, the direct insertion of the gas suctioning needle assembly and the gas injecting needle assembly into the hole yields a higher utilization and lower waste of the inert gas, and the constant gas exchanging speed makes the concentration of the inert gas in the hollow glass stable; meanwhile, the limitation of the normal size of the hollow glass is also broken through, allowing to inflate a large-size hollow glass which is hard to operate normally.

BRIEF DESCRIPTION OF DRAWINGS

In order to further clearly describe the technical solutions of the embodiments of the present disclosure or the prior art, a brief description will be given to the drawings which are used in the embodiments. Apparently, the drawings described below are merely some examples of the present disclosure. As for an ordinary person skilled in the art, other drawings can also be derived based on the present drawings without any creative attempt.

DETAILED DESCRIPTION OF ILLUSTRATIVE EMBODIMENTS

In order to further clarify the object, technical solutions and advantages of the present disclosure, a clear, complete and detailed description will be further given to the technical solutions of the embodiments of the present disclosure. It is apparent that the embodiments described herein are merely some but not all examples of the present disclosure. All the other embodiments derived from the embodiments of the present disclosure by an ordinary person skilled in the art fall in the scope of the present disclosure.

An external inflator is provided according to the embodiments of the present disclosure.

Figure 1:
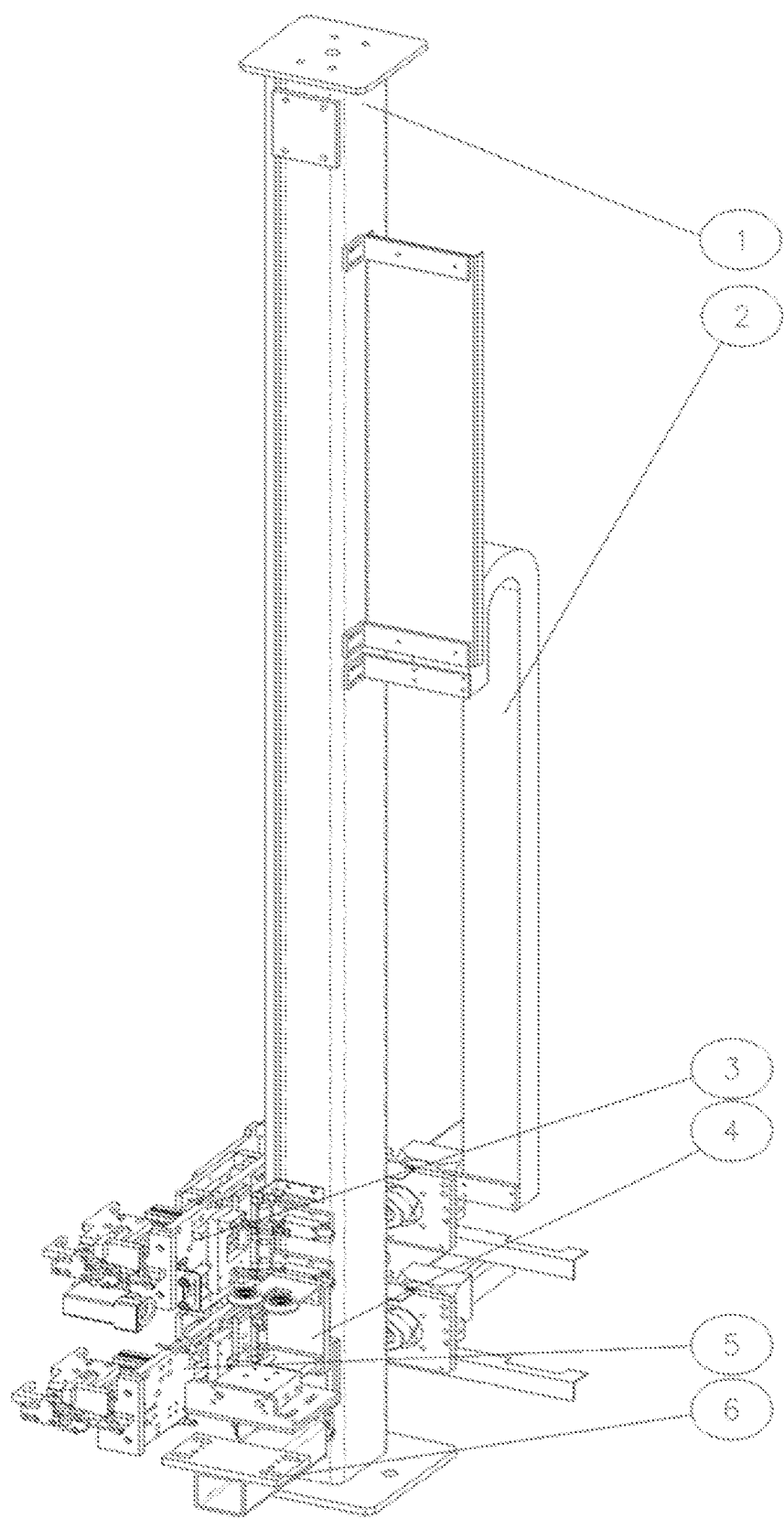
FIG. 1 is a perspective view of the external inflator according to an embodiment of the present disclosure.
Figure 2:
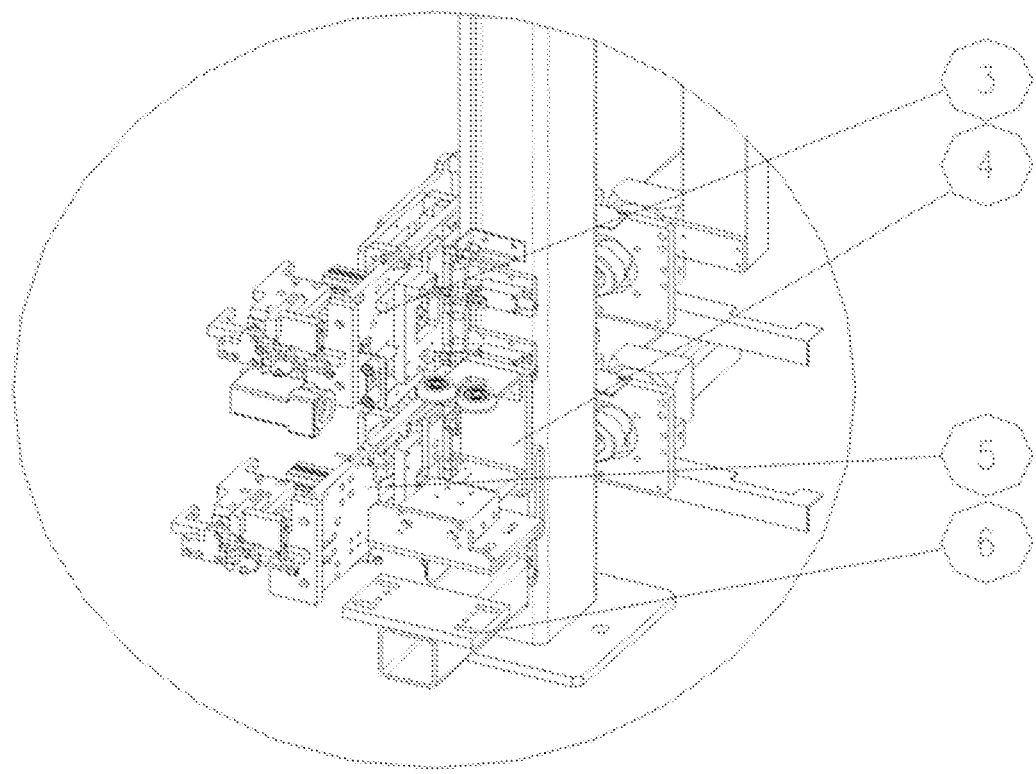
FIG. 2 is a partly enlarged view of the structural relation between the upper inflating platform, the pressing and positioning assembly, the lower inflating platform and the lower supporting beam in the external inflator according to an embodiment of the present disclosure.

As shown in FIGS. 1 and 2, the external inflator according to an embodiment of the present disclosure comprises a lifting pillar 1, which is a long column with rectangular cross-section and provided vertically on a fixing plane; the lifting pillar 1 has a wide fixing plate on one side, with the wide fixing plate fixedly connecting to an end of a cableveyor 2; the lifting pillar 1 has power cable inside to which the cableveyor 2 is electrically connected via the wide fixing plate; the lifting pillar 1 has an upper inflating platform 3 and an lower inflating platform 5 sheathed thereon, with the upper inflating platform 3 being above the lower inflating platform 5; the upper inflating platform 3 is fixedly connecting to the other end of the cableveyor 2 via which the upper inflating platform 3 is electrically connecting to the power cable inside the lifting pillar 1; a pressing and positioning assembly 4 is provided and electrically connected between the upper inflating platform 3 and the lower inflating platform 5, which allows the lower inflating platform to electrically connect to the power cable inside the lifting pillar 1; the pressing and positioning assembly 4 is mechanically connected to the upper inflating platform 3 and the lower inflating platform 5 respectively and being able to alter the friction between the lifting pillar 1 and either of the upper inflating platform 3 and the lower inflating platform 5 under electrical control, which allows the upper inflating platform 3 and the lower inflating platform 5 to move or stop; the lifting pillar 1 also has a lower supporting beam 6 fixed at the bottom end thereof, which provides a lowest height limit for the lower inflating platform 5.

Figure 3:
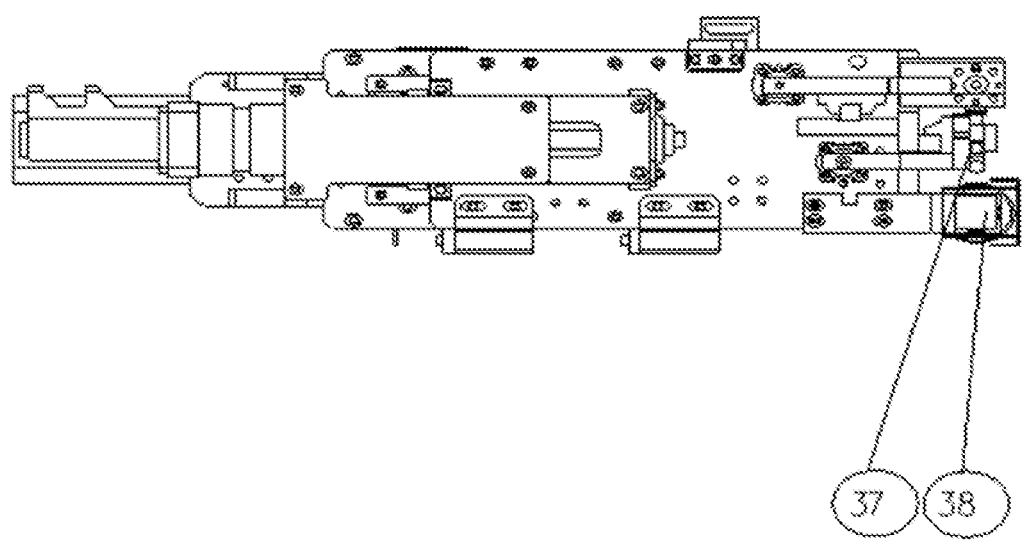
FIG. 3 is a front view of the upper inflating platform of the external inflator according to an embodiment of the present disclosure.
Figure 4:
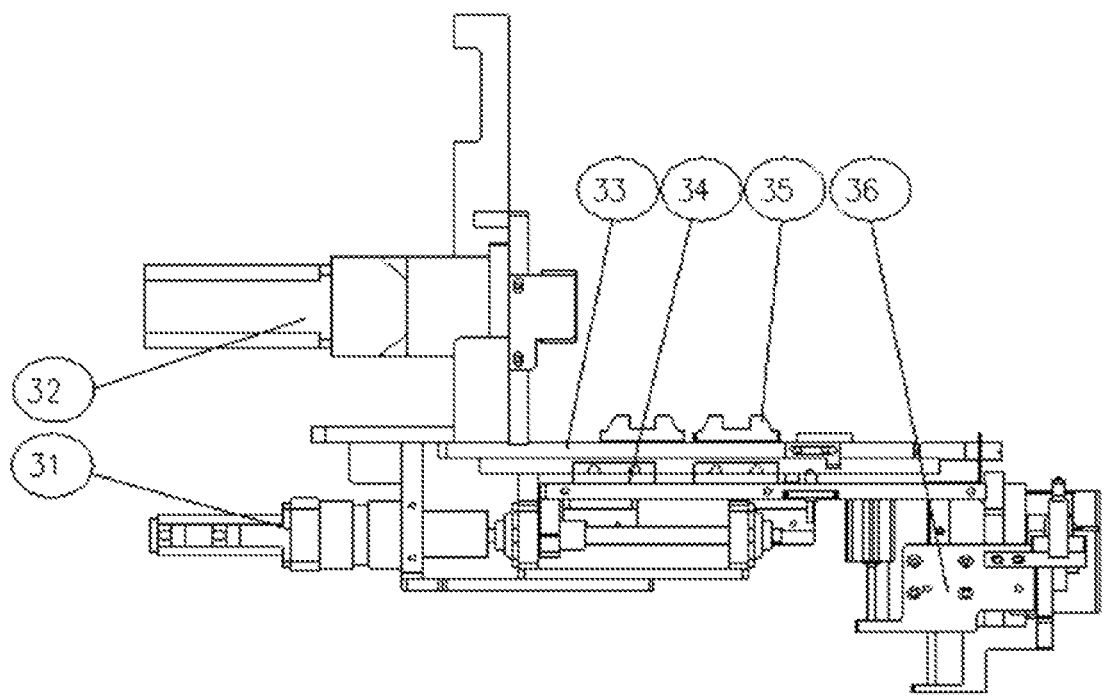
FIG. 4 is a top view of the upper inflating platform of the external inflator according to an embodiment of the present disclosure.

FIGS. 3 and 4 illustrate the configuration of the upper inflating platform 3. As shown in FIGS. 2 and 3, the upper inflating platform 3 comprises an upper inflating platform frame 33, which is a rectangular sheet with its rectangular plane being parallel to the front opposite surface of the lifting pillar 1; the upper inflating platform frame 33 has an upper inflating platform advancing motor assembly 31 fixed at the end thereof and has an upper inflating platform advancing ball screw assembly 34 on the side facing the lifting pillar 1, with the upper inflating platform advancing motor assembly 31 mechanically connecting to the upper inflating platform advancing ball screw assembly 34 via a wheel shaft assembly provided on the side of the upper inflating platform frame 33 opposite to the lifting pillar 1, and allowing the upper inflating platform 3 to move close to or away from the lifting pillar 1 by controlling the upper inflating platform advancing ball screw assembly 34; the upper inflating platform frame 33 has an extension sheet fixed vertically at the end thereof, the extension sheet having an upper inflating platform lifting motor assembly 32 fixed thereon, with the upper inflating platform lifting motor assembly 32 being parallel to the upper inflating platform frame 33, the upper inflating platform frame 33 having an upper inflating platform entirely lifting slider 35 on the side facing the lifting pillar 1, the upper inflating platform lifting motor assembly 32 mechanically connecting to the upper inflating platform entirely lifting slider 35 and allowing the upper inflating platform 3 to move up and down relative to the lifting pillar 1 by controlling the upper inflating platform entire lifting slider 35; the upper inflating platform frame 33 has an upper inflating platform pressing system 36 fixed at the front end thereof, the upper inflating platform pressing system 36 being for providing low barometric pressure to an gas suctioning needle assembly 37 mentioned below; the upper inflating platform frame 33 also has an gas suctioning needle assembly 37 fixed at the front end thereof, the gas suctioning needle assembly 37 being in communication with the upper inflating platform pressing system 36 and being able to suction gas from a needle eye; the upper inflating platform frame 33 also has a positioning camera assembly 38 fixed at the front end thereof, the positioning camera assembly 38 being able to record and locate position of the needle eye.

Figure 5:
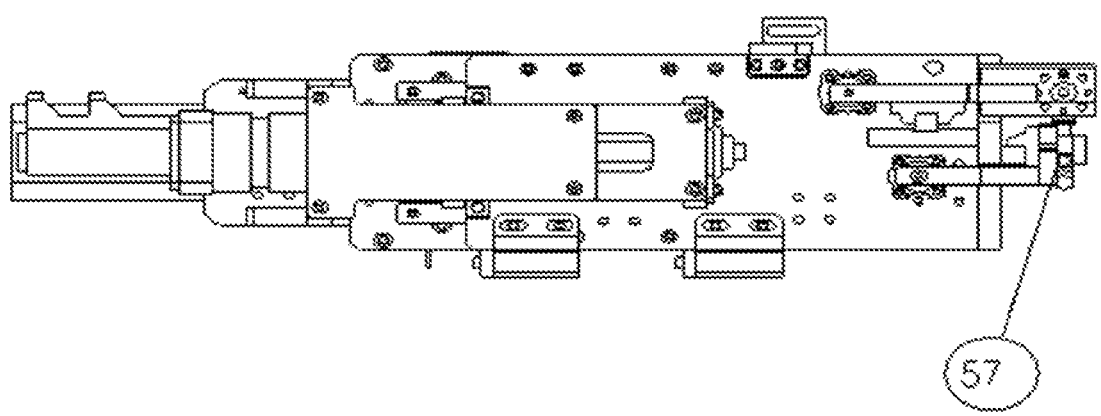
FIG. 5 is a front view of the lower inflating platform of the external inflator according to an embodiment of the present disclosure.
Figure 6:
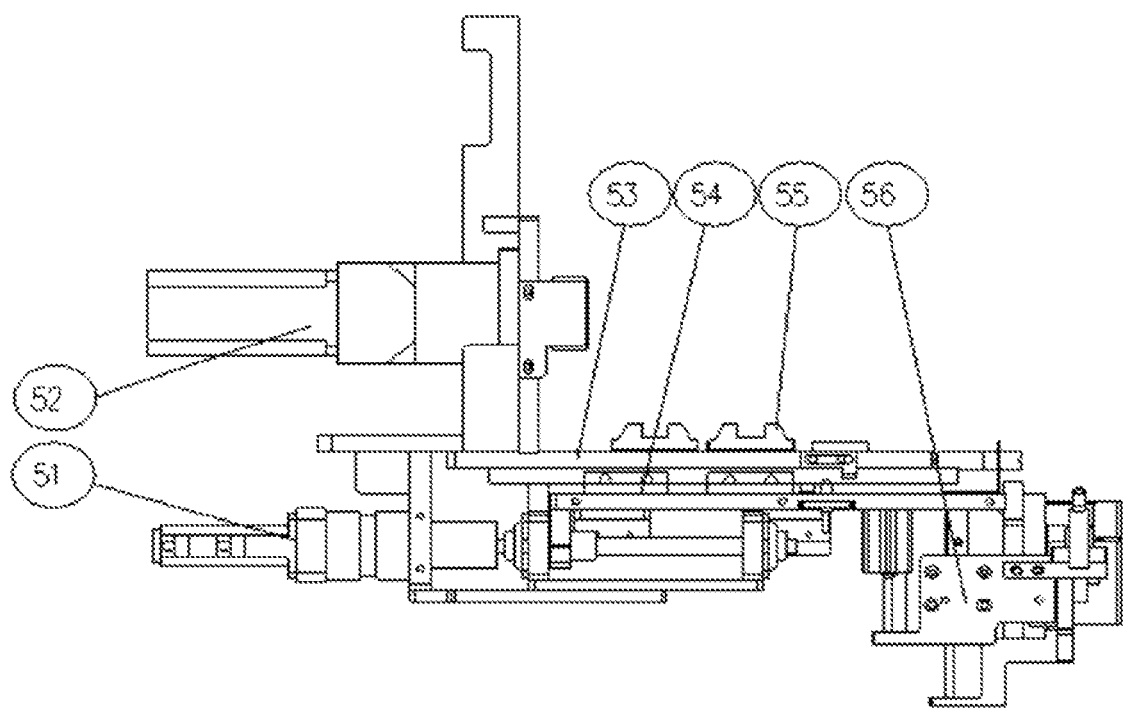
FIG. 6 is a top view of the lower inflating platform of the external inflator according to an embodiment of the present disclosure.

FIGS. 5 and 6 illustrate the configuration of the lower inflating platform 5. As shown in FIGS. 4 and 5, the lower inflating platform 5 comprises an lower inflating platform frame 53, which is a rectangular sheet with its rectangular plane being parallel to the front opposite surface of the lifting pillar 1; the lower inflating platform frame 53 has an lower inflating platform advancing motor assembly 51 fixed at the end thereof and has an lower inflating platform advancing ball screw assembly 54 on the side facing the lifting pillar 1, with the lower inflating platform advancing motor assembly 51 mechanically connecting to the lower inflating platform advancing ball screw assembly 54 via a wheel shaft assembly provided on the side of the lower inflating platform frame 53 opposite to the lifting pillar 1, and allowing the lower inflating platform 5 to move close to or away from the lifting pillar 1 by controlling the lower inflating platform advancing ball screw assembly 54; the lower inflating platform frame 53 has an extension sheet fixed vertically at the end thereof, the extension sheet having an lower inflating platform lifting motor assembly 52 fixed thereon, with the lower inflating platform lifting motor assembly 52 being parallel to the lower inflating platform frame 53, the lower inflating platform frame 53 having an lower inflating platform entirely lifting slider 55 on the side facing the lifting pillar 1, the lower inflating platform lifting motor assembly 52 mechanically connecting to the lower inflating platform entirely lifting slider 55 and allowing the lower inflating platform 5 to move up and down relative to the lifting pillar 1 by controlling the lower inflating platform entire lifting slider 55; the lower inflating platform frame 53 has an lower inflating platform pressing system 56 fixed at the front end thereof, the lower inflating platform pressing system 56 being for providing high barometric pressure to an gas injecting needle assembly 57 mentioned below; the lower inflating platform frame 53 also has an gas injecting needle assembly 57 fixed at the front end thereof, the gas injecting needle assembly 57 being in communication with the lower inflating platform pressing system 56 and being able to inject gas via a needle eye.

Figure 8:
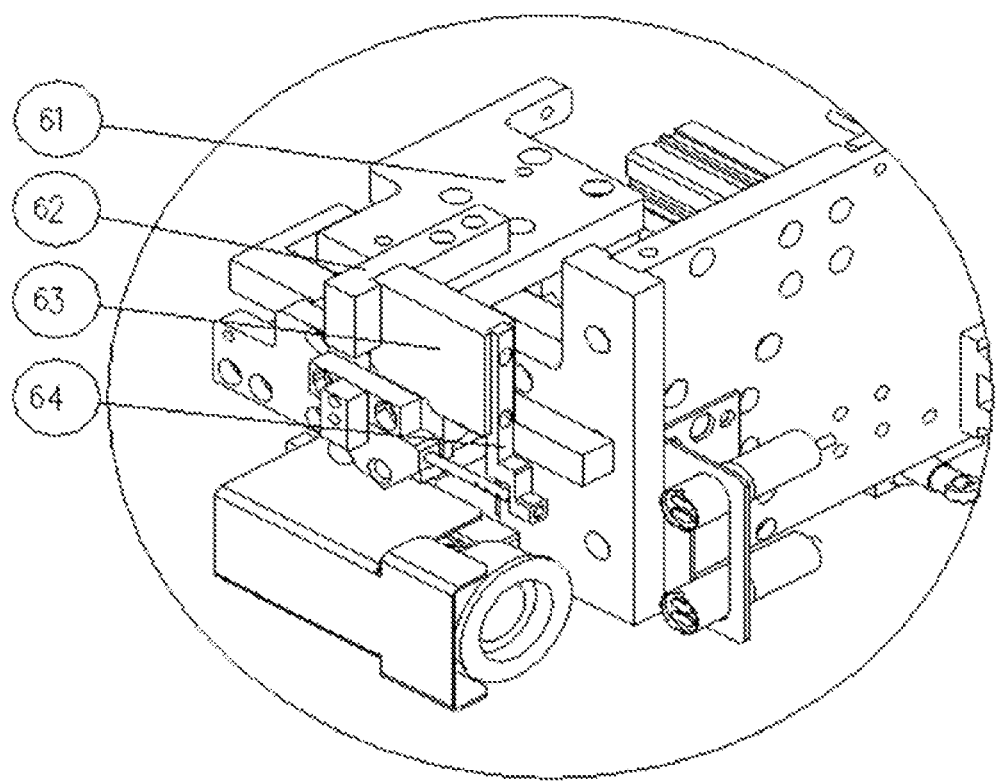
FIG. 8 is a structural view of the upper inflating platform pressing system and the lower inflating platform pressing system in the external inflator according to an embodiment of the present disclosure.

FIG. 8 illustrates the configuration of the upper inflating platform pressing system 36 and the lower inflating platform pressing system 56. As shown in FIG. 8, the upper inflating platform pressing system 36 has the same configuration as the lower inflating platform pressing system 56, each of them comprising a pressing cylinder connecting plate 61, a bracket fixing plate 62, a pressing bracket 63 and a pressing block 64, in which, the bracket fixing plate 62 is fixed on the side of the upper inflating platform frame 33 or the lower inflating platform frame 53 opposite to the lifting pillar 1 and mechanically connected to the pressing cylinder connecting plate 61, with the pressing cylinder connecting plate 61 being provided on the side of the upper inflating platform frame 33 or the lower inflating platform frame 53 opposite to the lifting pillar 1 and being able to provide gas of high pressure; the bracket fixing plate 62 is mechanically connected to the pressing bracket 63, which is a hard sheet and provided vertical to the pressing cylinder connecting plate 61 and the bracket fixing plate 62, the pressing bracket 63 having a front end fixed to the bracket fixing plate 62 and fixedly connecting to the pressing block 64 by a bolt; the pressing block 64, being a bended hard bar, has an end fixed to the pressing bracket 63 by a bolt and has the other end provided with a hole, through which the needle head of the gas suctioning needle assembly 37 or the gas injecting needle assembly 57 passes and directs toward the lifting pillar 1, the outer diameter of the needle head being slightly smaller than the inner diameter of the hole.

Figure 7:
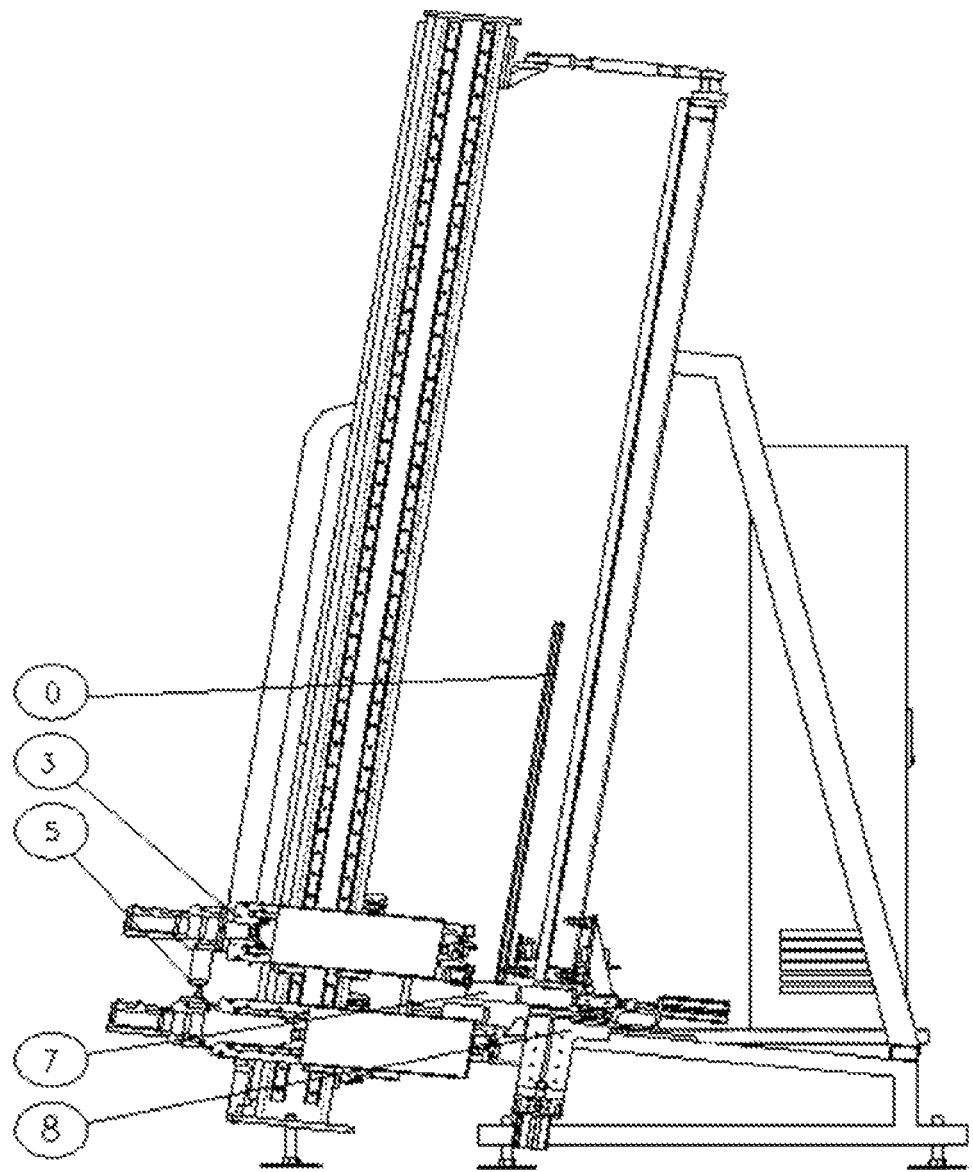
FIG. 7 is a side view of the external inflator mounted with a hollow glass thereon according to an embodiment of the present disclosure.

FIG. 7 illustrates a side view of the external inflator mounted with a hollow glass. As shown in FIG. 7, a hollow glass 0 to be inflated is placed vertically on a transferring roller 7 which is used for transferring the hollow glass 0 to a mechanical limiter 8, the mechanical limiter 8 moving the hollow glass 0 backward, and the hollow glass 0 having two transverse spacer bars fixed inside and two through-holes provided on the side facing the upper inflating platform 3 and the lower inflating platform 5, with the two through-holes each located at a position where the two transverse spacer bars of the hollow glass 0 are located; the upper inflating platform 3 is configured to move upward along the lifting pillar 1, during which the positioning camera assembly 38 is configured to locate the height of the two through-holes on the hollow glass 0, and the upper inflating platform 3 is configured to stay at the position of the upper hole of the two through-holes and transfers the information about the position of the lower hole of the two through-holes to the lower inflating platform 5, with the lower inflating platform 5 moving upward to the position of the lower hole of the two through-holes; the pressing cylinder connecting plate 61 of the upper inflating platform pressing system 36 is configured to allow the gas suctioning needle assembly 37 to insert into the upper hole, meanwhile the pressing cylinder connecting plate 61 of the lower inflating platform pressing system 56 is configured to allow the gas injecting needle assembly 57 to insert into the lower hole, the gas suctioning needle assembly 37 starts to suction gas and the gas injecting needle assembly 57 starts to inject inert gas; after the injection of the inert gas, the pressing cylinder connecting plate 61 of the upper inflating platform pressing system 36 pulls out the gas suctioning needle assembly 37, meanwhile the pressing cylinder connecting plate 61 of the lower inflating platform pressing system 56 pulls out the gas injecting needle assembly 57, both of the upper inflating platform 3 and the lower inflating platform 5 move downward to an original position.

Specifically, the injected inert gas is Argon; the gas exchanging speed of the gas suctioning needle assembly 37 and the gas injecting needle assembly 57 is 50-90 liters per minute.

In summary, by means of the technical solution of the present disclosure, an automatic inflation under control is achieved by using the positioning camera assembly to locate the position of the gas hole of the hollow glass so as to allow the upper inflating platform and the lower inflating platform move up and down to the position of the gas hole along the lifting pillar, the direct insertion of the gas suctioning needle assembly and the gas injecting needle assembly into the hole yields a higher utilization and lower waste of the inert gas, and the constant gas exchanging speed makes the concentration of the inert gas in the hollow glass stable; meanwhile, the limitation of the normal size of the hollow glass is also broken through, allowing to inflate a large-size hollow glass which is hard to operate normally.

An ordinary person skilled in the art should understand that the description above is merely some specific embodiments of the present disclosure, but does not intend to limit the present disclosure. Within the spirit and principle of the present disclosure, any modifications, equivalent replacements and alterations are all in the scope of the present disclosure.

What is claimed:

1. An external inflator, comprising a lifting pillar (1) which is a long column with rectangular cross-section and provided vertically on a fixing plane, wherein the lifting pillar (1) has a wide fixing plate on one side, with the wide fixing plate fixedly connecting to an end of a cableveyor (2); the lifting pillar (1) has power cable inside to which the cableveyor (2) is electrically connected via the wide fixing plate; the lifting pillar (1) has an upper inflating platform (3) and an lower inflating platform (5) sheathed thereon, with the upper inflating platform (3) being above the lower inflating platform (5); the upper inflating platform (3) is fixedly connected to the other end of the cableveyor (2) via which the upper inflating platform (3) is electrically connected to the power cable inside the lifting pillar (1); a pressing and positioning assembly (4) is provided and electrically connected between the upper inflating platform (3) and the lower inflating platform (5), which allows the lower inflating platform (5) to electrically connect to the power cable inside the lifting pillar (1); the pressing and positioning assembly (4) is mechanically connected to the upper inflating platform (3) and the lower inflating platform (5) respectively and being able to adjust the friction between the lifting pillar (1) and either of the upper inflating platform (3) and the lower inflating platform (5) under electrical control, which allows the upper inflating platform (3) and the lower inflating platform (5) to move or stop; the lifting pillar (1) also has a lower supporting beam (6) fixed at the bottom thereof, which provides a lowest height limit for the lower inflating platform (5), wherein the lower inflating platform (5) comprises a gas injecting needle assembly (57) to be able to communicated with a inflating means to inject gas.

2. The external inflator according to claim 1, wherein the upper inflating platform (3) comprises an upper inflating platform frame (33) which is a rectangular sheet with its rectangular plane being parallel to the front opposite surface of the lifting pillar (1); the upper inflating platform frame (33) has an upper inflating platform advancing motor assembly (31) fixed at the end thereof and has an upper inflating platform advancing ball screw assembly (34) on the side facing the lifting pillar (1), with the upper inflating platform advancing motor assembly (31) mechanically connecting to the upper inflating platform advancing ball screw assembly (34) via a wheel shaft assembly provided on the side of the upper inflating platform frame (33) opposite to the lifting pillar (1), and allowing the upper inflating platform (3) to move close to or away from the lifting pillar (1) by controlling the upper inflating platform advancing ball screw assembly (34); the upper inflating platform frame (33) has an extension sheet fixed vertically at the end thereof, the extension sheet having an upper inflating platform lifting motor assembly (32) fixed thereon, with the upper inflating platform lifting motor assembly (32) being parallel to the upper inflating platform frame (33), the upper inflating platform frame (33) having an upper inflating platform entirely lifting slider (35) on the side facing the lifting pillar (1), the upper inflating platform lifting motor assembly (32)

mechanically connecting to the upper inflating platform entirely lifting slider (35) and allowing the upper inflating platform (3) to move up and down relative to the lifting pillar (1) by controlling the upper inflating platform entire lifting slider (35); the upper inflating platform frame (33) has an upper inflating platform pressing system (36) fixed at the front end thereof, the upper inflating platform pressing system (36) being for providing low barometric pressure to an gas suctioning needle assembly (37) mentioned below; the upper inflating platform frame (33) also has an gas suctioning needle assembly (37) fixed at the front end thereof, the gas suctioning needle assembly (37) being in communication with the upper inflating platform pressing system (36) and being able to suction gas from a needle eye; the upper inflating platform frame (33) also has a positioning camera assembly (38) fixed at the front end thereof, the positioning camera assembly (38) being able to record and locate position of the needle eye.

3. The external inflator according to claim 1, wherein the lower inflating platform (5) comprises an lower inflating platform frame (53) which is a rectangular sheet with its rectangular plane being parallel to the front opposite surface of the lifting pillar (1); the lower inflating platform frame (53) has an lower inflating platform advancing motor assembly (51) fixed at the end thereof and has an lower inflating platform advancing ball screw assembly (54) on the side facing the lifting pillar (1), with the lower inflating platform advancing motor assembly (51) mechanically connecting to the lower inflating platform advancing ball screw assembly (54) via a wheel shaft assembly provided on the side of the lower inflating platform frame (53) opposite to the lifting pillar (1), and allowing the lower inflating platform (5) to move close to or away from the lifting pillar (1) by controlling the lower inflating platform advancing ball screw assembly (54); the lower inflating platform frame (53) has an extension sheet fixed vertically at the end thereof, the extension sheet having an lower inflating platform lifting motor assembly (52) fixed thereon, with the lower inflating platform lifting motor assembly (52) being parallel to the lower inflating platform frame (53), the lower inflating platform frame (53) having an lower inflating platform entirely lifting slider (55) on the side facing the lifting pillar (1), the lower inflating platform lifting motor assembly (52) mechanically connecting to the lower inflating platform entirely lifting slider (55) and allowing the lower inflating platform (5) to move up and down relative to the lifting pillar (1) by controlling the lower inflating platform entire lifting slider (55); the lower inflating platform frame (53) has an lower inflating platform pressing system (56) fixed at the front end thereof, the lower inflating platform pressing system (56) being for providing high barometric pressure to an gas injecting needle assembly (57) mentioned below; the lower inflating platform frame (53) also has an gas injecting needle assembly (57) fixed at the front end thereof, the gas injecting needle assembly (57) being in communication with the lower inflating platform pressing system (56) and being able to inject gas via a needle eye.

4. The external inflator according to claim 3, wherein the upper inflating platform (3) comprises an upper inflating platform frame (33) which is a rectangular sheet with its rectangular plane being parallel to the front opposite surface of the lifting pillar (1); the upper inflating platform frame (33) has an upper inflating platform advancing motor assembly (31) fixed at the end thereof and has an upper inflating platform advancing ball screw assembly (34) on the side facing the lifting pillar (1), with the upper inflating platform advancing motor assembly (31) mechanically connecting to the upper inflating platform advancing ball screw assembly (34) via a wheel shaft assembly provided on the side of the upper inflating platform frame (33) opposite to the lifting pillar (1), and allowing the upper inflating platform (3) to move close to or away from the lifting pillar (1) by controlling the upper inflating platform advancing ball screw assembly (34); the upper inflating platform frame (33) has an extension sheet fixed vertically at the end thereof, the extension sheet having an upper inflating platform lifting motor assembly (32) fixed thereon, with the upper inflating platform lifting motor assembly (32) being parallel to the upper inflating platform frame (33), the upper inflating platform frame (33) having an upper inflating platform entirely lifting slider (35) on the side facing the lifting pillar (1), the upper inflating platform lifting motor assembly (32) mechanically connecting to the upper inflating platform entirely lifting slider (35) and allowing the upper inflating platform (3) to move up and down relative to the lifting pillar (1) by controlling the upper inflating platform entire lifting slider (35); the upper inflating platform frame (33) has an upper inflating platform pressing system (36) fixed at the front end thereof, the upper inflating platform pressing system (36) being for providing low barometric pressure to an gas suctioning needle assembly (37) mentioned below; the upper inflating platform frame (33) also has an gas suctioning needle assembly (37) fixed at the front end thereof, the gas suctioning needle assembly (37) being in communication with the upper inflating platform pressing system (36) and being able to suction gas from a needle eye; the upper inflating platform frame (33) also has a positioning camera assembly (38) fixed at the front end thereof, the positioning camera assembly (38) being able to record and locate position of the needle eye; and wherein the lower inflating platform (5) comprises an lower inflating platform frame (53) which is a rectangular sheet with its rectangular plane being parallel to the front opposite surface of the lifting pillar (1); the lower inflating platform frame (53) has an lower inflating platform advancing motor assembly (51) fixed at the end thereof and has an lower inflating platform advancing ball screw assembly (54) on the side facing the lifting pillar (1), with the lower inflating platform advancing motor assembly (51) mechanically connecting to the lower inflating platform advancing ball screw assembly (54) via a wheel shaft assembly provided on the side of the lower inflating platform frame (53) opposite to the lifting pillar (1), and allowing the lower inflating platform (5) to move close to or away from the lifting pillar (1) by controlling the lower inflating platform advancing ball screw assembly (54); the lower inflating platform frame (53) has an extension sheet fixed vertically at the end thereof, the extension sheet having an lower inflating platform lifting motor assembly (52) fixed thereon, with the lower inflating platform lifting motor assembly (52) being parallel to the lower inflating platform frame (53), the lower inflating platform frame (53) having an lower inflating platform entirely lifting slider (55) on the side facing the lifting pillar (1), the lower inflating platform lifting motor assembly (52) mechanically connecting to the lower inflating platform entirely lifting slider (55) and allowing the lower inflating platform (5) to move up and down relative to the lifting pillar (1) by controlling the lower inflating platform entire lifting slider (55); the lower inflating platform frame (53) has an lower inflating platform pressing system (56) fixed at the front end thereof, the lower inflating platform pressing system (56) being for providing high barometric pressure to an gas injecting needle assembly (57) mentioned below; the lower inflating platform frame (53) also has an gas injecting needle assembly (57) fixed at the front end thereof, the gas injecting needle assembly (57) being in communication with the lower inflating platform pressing system (56) and being able to inject gas via a needle eye.

5. The external inflator according to claim 4, wherein the upper inflating platform pressing system (36) has the same configuration as the lower inflating platform pressing system (56), each of them comprising a pressing cylinder connecting plate (61), a bracket fixing plate (62), a pressing bracket (63) and a pressing block (64), in which, the bracket fixing plate (62) is fixed on the side of the upper inflating platform frame (33) or the lower inflating platform frame (53) opposite to the lifting pillar (1) and mechanically connected to the pressing cylinder connecting plate (61), with the pressing cylinder connecting plate (61) being provided on the side of the upper inflating platform frame (33) or the lower inflating platform frame (53) opposite to the lifting pillar (1) and being able to provide gas of high pressure; the bracket fixing plate (62) is mechanically connected to the pressing bracket (63), which is a hard sheet and provided vertical to the pressing cylinder connecting plate (61) and the bracket fixing plate (62), the pressing bracket (63) having a front end fixed to the bracket fixing plate (62) and fixedly connecting to the pressing block (64) by a bolt; the pressing block (64), being a bended hard bar, has an end fixed to the pressing bracket (63) by a bolt and has the other end provided with a hole, through which the needle head of the gas suctioning needle assembly (37) or the gas injecting needle assembly (57) passes and directs toward the lifting pillar (1), the outer diameter of the needle head being slightly smaller than the inner diameter of the hole.

6. The external inflator according to claim 5, wherein a hollow glass (0) to be inflated is placed vertically on a transferring roller (7) which is used for transferring the hollow glass (0) to a mechanical limiter (8), the mechanical limiter (8) moving the hollow glass (0) backward, and the hollow glass (0) having two transverse spacer bars fixed inside and two through-holes provided on the side facing the upper inflating platform (3) and the lower inflating platform (5), with the two through-holes each located at a position where the two transverse spacer bars of the hollow glass (0) are located; the upper inflating platform (3) is configured to move upward along the lifting pillar (1), during which the positioning camera assembly (38) is configured to locate the height of the two through-holes on the hollow glass (0), and the upper inflating platform (3) is configured to stay at the position of the upper hole of the two through-holes and transfers the information about the position of the lower hole of the two through-holes to the lower inflating platform (5), with the lower inflating platform (5) moving upward to the position of the lower hole of the two through-holes; the pressing cylinder connecting plate (61) of the upper inflating platform pressing system (36) is configured to allow the gas suctioning needle assembly (37) to insert into the upper hole, meanwhile the pressing cylinder connecting plate (61) of the lower inflating platform pressing system (56) is configured to allow the gas injecting needle assembly (57) to insert into the lower hole, the gas suctioning needle assembly (37) starts to suction gas and the gas injecting needle assembly (57) starts to inject inert gas; after the injection of the inert gas, the pressing cylinder connecting plate (61) of the upper inflating platform pressing system (36) pulls out the gas suctioning needle assembly (37), meanwhile the pressing cylinder connecting plate (61) of the lower inflating platform pressing system (56) pulls out the gas injecting needle assembly (57), both of the upper inflating platform (3) and the lower inflating platform (5) move downward to an original position.

7. The external inflator according to claim 5, wherein the injected inert gas is Argon; the gas exchanging speed of the gas suctioning needle assembly (37) and the gas injecting needle assembly (57) is 50-90 liters per minute.

* * * * *